(12) United States Patent
May

(10) Patent No.: US 12,476,937 B2
(45) Date of Patent: *Nov. 18, 2025

(54) SYSTEMS AND METHODS FOR CLOUD BASED ROOT SERVICE APPLICATION ACROSS MULTIPLE COOPERATIVE SECURITY FABRICS

(71) Applicant: Fortinet, Inc., Sunnyvale, CA (US)

(72) Inventor: Robert A. May, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/857,133

(22) Filed: Jul. 4, 2022

(65) Prior Publication Data

US 2024/0007438 A1    Jan. 4, 2024

(51) Int. Cl.
*H04L 9/40* (2022.01)
*H04L 41/16* (2022.01)
*H04W 12/08* (2021.01)

(52) U.S. Cl.
CPC ............ *H04L 63/0263* (2013.01); *H04L 9/40* (2022.05); *H04L 41/16* (2013.01); *H04L 63/00* (2013.01); *H04L 63/10* (2013.01); *H04L 63/14* (2013.01); *H04L 63/1441* (2013.01); *H04W 12/08* (2013.01)

(58) Field of Classification Search
CPC ....... H04L 63/0263; H04L 9/40; H04L 41/16; H04L 63/00; H04L 63/10; H04L 63/14; H04L 63/1441; H04W 12/08
See application file for complete search history.

(56) References Cited

U.S. PATENT DOCUMENTS

| | | |
|---|---|---|
| 5,351,776 A | 10/1994 | Keller et al. |
| 2007/0294755 A1 | 12/2007 | Dadhia |
| 2011/0185085 A1 | 7/2011 | Perkins |
| 2016/0080399 A1* | 3/2016 | Harris ................ H04L 63/1433 726/23 |
| 2017/0005986 A1* | 1/2017 | Bansal .................... G06F 9/455 |
| 2023/0328105 A1 | 10/2023 | Xie et al. |

OTHER PUBLICATIONS

Office Action for U.S. Appl. No. 17/719,175, mailed Jul. 2, 2024, 29 pages.
Office Action for U.S. Appl. No. 17/719,175 29 pages, Jan. 7, 2025.
Office Action for U.S. Appl. No. 17/719,175 mailed May 29, 2025, 30 pages.

* cited by examiner

*Primary Examiner* — Jung W Kim
*Assistant Examiner* — Howard H. Louie
(74) *Attorney, Agent, or Firm* — Jaffery Watson Hamilton & DeSanctis LLP

(57) ABSTRACT

Systems, devices, and methods are discussed for treating a number of network security devices in a cooperative security fabric using a cloud based root.

20 Claims, 12 Drawing Sheets

SYSTEMS AND METHODS FOR CLOUD BASED ROOT SERVICE APPLICATION ACROSS MULTIPLE COOPERATIVE SECURITY FABRICS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to systems and methods for performing network security, and more particularly to systems and methods for treating a number of network security devices in a cooperative security fabric using a cloud based root.

BACKGROUND

As network interconnectivity becomes more complex and the potential and effect of network security breaches more pronounced, greater costs are required to assure network security. In addition, the complexity of networks can result in unintended holes in security. Further, approaching a cooperative security fabric from the perspective of only the cooperative security fabric reduces the possibility of mitigating security problems migrating from other cooperative security fabrics. Additionally, implementing the root of a cooperative security fabric as part of a network security device included within the cooperative security fabric results in specifying a network security device to perform both network security operations and cooperative security fabric operations. Such an approach can result in difficulty selecting the appropriate hardware features as the network security operations and cooperative security fabric operations may not scale similarly.

Hence, there exists a need in the art for a cost-effective network security that reduces the possibility of unintended holes in security and/or allows for scaling as security needs change.

SUMMARY

Various embodiments provide systems and methods for treating a number of network security devices in a cooperative security fabric using a cloud based root.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Various embodiments provide systems and methods for treating a number of network security devices in a cooperative security fabric using a cloud based root.

Figure 8:
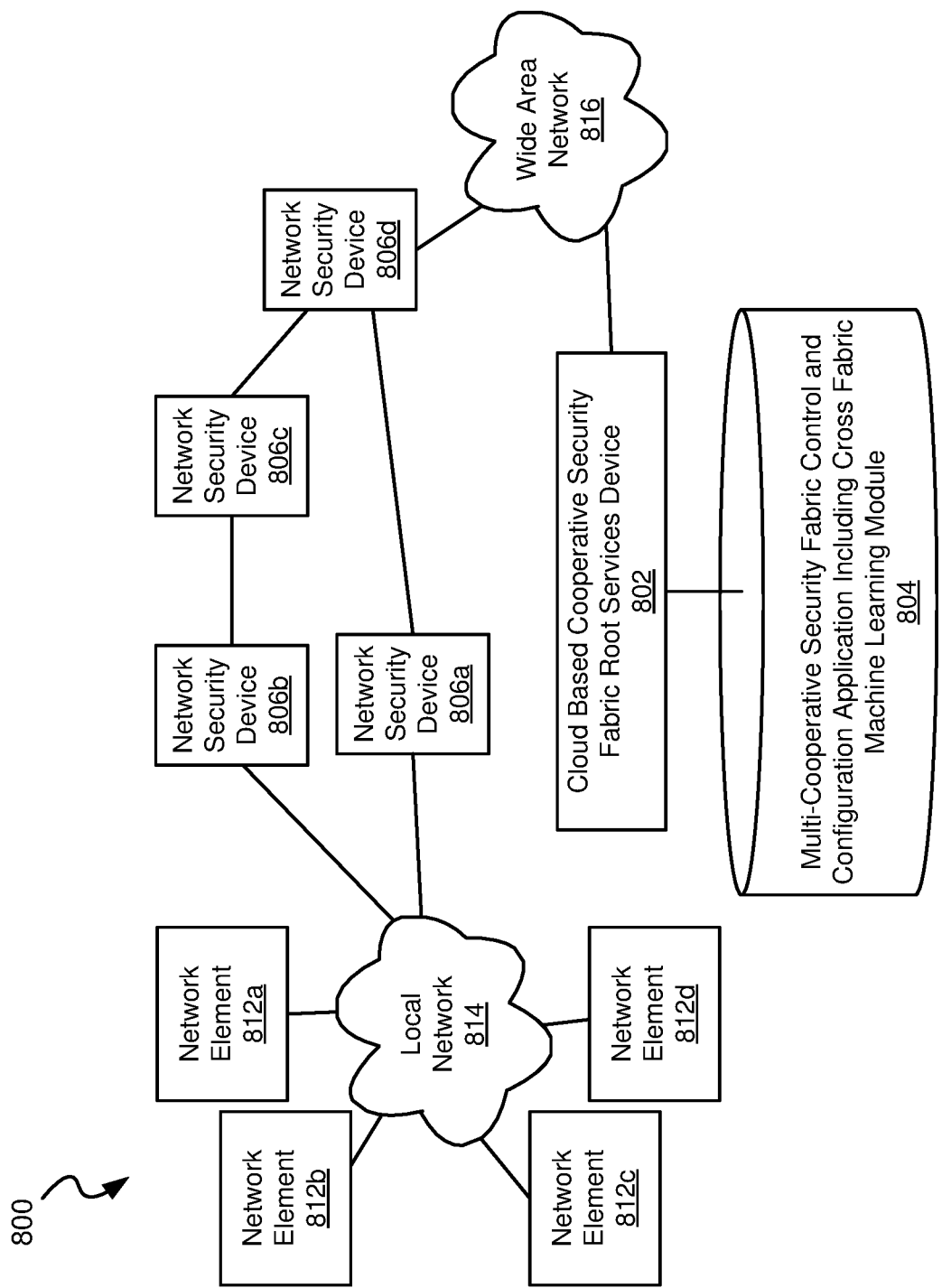
FIG. 8 shows an example cooperative security fabric that may be used in accordance with various embodiments.

A cooperative security fabric includes a number of interconnected network security devices. Each of the network security devices may be responsible for protecting respective local networks either by themselves or in concert with another network security device. FIG. 8 shows a simple cooperative security fabric 800 where two network security devices (i.e., a network security device 806a and a network security device 806b) control access to network elements 812 (i.e., a network element 812a, a network element 812b, a network element 812c, and a network element 812d) that are interconnected by a local network 814. Additional network security devices 806 (i.e., network security device 806c and network security device 806d) are interconnected with network security device 806a and network security device 806b via respective device ports.

Further, access to a wide area network 816 may be provided via network security device 806d. In an example implementation, network security device 806a may control access to local network 814 by a first set of users, network security device 806 may control access to local network 814 by a second set of users, network security device 806c may control access to another local network (not shown), and network security device 806d may control all accesses to the Internet. Additionally, network security device 806d is communicably coupled to a cloud based cooperative security fabric root services device 802 via wide area network 816. Cloud based cooperative security fabric root services device

802 is coupled to a computer readable medium having stored thereon a multi-cooperative security fabric control and configuration application 804.

In general, cooperative security fabric 800 is implemented or constructed in a form of a tree, having a root node (in this case cloud based cooperative security fabric root services device 802), one or more intermediate nodes (in this case network security device 806c), and one or more leaf nodes (in this cases network security device 806a and network security device 806b), based on hierarchical interconnections among the network security devices by determining a relative upstream or downstream relationship among each network security devices 806. Backend daemons of the network security devices 806 establish and maintain a bi-directional tunnel between each parent node within the CSF and its respective child node(s) through which queries and replies are communicated and through which periodic keep-alive messages and responses are exchanged. Forward daemons of the network security devices enforce a cooperative security fabric protocol that limits the issuance of query messages to those originated by an upstream node within cooperative security fabric 800 and directed to a downstream node within cooperative security fabric 800. In some cases, cloud based cooperative security fabric root services device 802 serves as a root node for other cooperative security fabrics (not shown).

Local network 814 may be any type of communication network known in the art. Those skilled in the art will appreciate that, local network 814 can be wireless network, a wired network, or a combination thereof that can be implemented as one of the various types of networks, such as an Intranet, a Local Area Network (LAN), and the like. Further, local network 814 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Similarly, wide area network 816 may be any type of communication network known in the art. Those skilled in the art will appreciate that, wide area network 816 can be wireless network, a wired network, or a combination thereof that can be implemented as one of the various types of networks.

Security in such a cooperative security fabric previously required a network administrator to implement a configuration in multiple individual network devices 806 within cooperative security fabric 800 (i.e., implement security protocols in each network element in isolation), and to rely on human process to assure the implementation is consistent and correct. In part to mitigate issues arising from such implementation in isolation, the systems and methods use the topology of cooperative security fabric both to identify modifications required to individual network security devices 806 within cooperative security fabric 800 to implement the family security policy, and use the communication mechanisms between individual network security devices 806 within cooperative security fabric 800 to distribute and apply the identified modifications.

In some embodiments, a "family mode" may be initiated for cooperative security fabric 800. This may be done, for example, by selecting family mode on a user interface. When family mode is selected, all network security devices 806 included in cooperative security fabric 800 are switched to family mode, and no network security device 806 other than the root node (in this case cloud based cooperative security fabric root services device 802) allow direct changes to security processes implemented by the network security device. Rather, changes to security processes implemented by the network security device are only accepted from the root node (either directly or via one or more intervening intermediate nodes). In some cases, direct changes to security processes of a given network (i.e., by a network administrator directly accessing the given network security device) is precluded by rendering normally available device access invisible. Alternatively, where family mode is not selected, direct changes to security settings on the network security devices of cooperative security fabric 800 is allowed via standard mechanisms.

Where the root node is implemented as cloud based cooperative security fabric root services device 802, selecting family mode on a user interface results in a number of cooperative security fabrics being controlled from the same root. In such a situation, the cooperative security fabric functions of cooperative security fabric 800 are controlled by cloud based cooperative security fabric root services device 802 and all network security devices 806 included in cooperative security fabric 800 are switched to operate in the family mode where changes to security processes implemented by the particular network security device are only accepted from the cloud based cooperative security fabric root services device (either directly or via one or more intervening intermediate nodes).

Where the root node is implemented as cloud based cooperative security fabric root services device 802 and the cooperative security fabric 800 is operating in the family mode, a security policy change is made by providing an indication of the security policy to cloud based cooperative security fabric root services device 802. In some embodiments, the indication of the security change is an intent based description of the security policy. Such an intent based security policy is translated into security settings (i.e., security objects or security messages) individualized for relevant network security devices 806 in cooperative security fabric 800. Any system and/or method for translation from intent based description to hardware specific implementation may be used in relation to embodiments discussed herein. In other embodiments, the indication of the security change includes specific changes (i.e., security objects) may be individualized for each relevant network security device 806 in cooperative security fabric 800. Such an approach does not require translation from intent to hardware specifics, but requires more of a network administrator.

In particular embodiments, two versions of family mode may be implemented: (1) a "full family mode" and (2) a "sub-family mode". When a full family mode is selected, all network security devices 806 included in all cooperative security fabrics associated with cloud based cooperative security fabric root services device 802 are switched to family mode, and no network security device 806 other than cloud based cooperative security fabric root services device 802 would be allowed to direct changes to security processes implemented by the network security device. Rather, changes to security processes implemented by the network security device are only accepted from cloud based cooperative security fabric root services device 802 (either directly or via one or more intervening intermediate nodes).

When a sub-family mode is selected, all network security devices 806 included in one or more selected cooperative security fabrics associated with cloud based cooperative security fabric root services device 802 are switched to family mode, and no network security device 806 other than cloud based cooperative security fabric root services device 802 included within the selected cooperative security fabrics would be allowed to direct changes to security processes implemented by the network security devices. Rather, changes to security processes implemented by the network security devices included within the selected cooperative security fabrics are only accepted from cloud based cooperative security fabric root services device 802 (either directly or via one or more intervening intermediate nodes). In contrast, changes to security processes implemented by network security devices that are not included within the selected cooperative security fabrics would be allowed to be implemented directly with such network security devices.

It is possible for cloud based cooperative security fabric root services device 802 to have multiple sub-families each including one or more cooperative security fabrics associated with cooperative security fabric root services device 802. In such a situation, each sub-family would operate in there own sub-family mode where changes to one sub-family is not replicated on another cooperative security fabric not included within the sub-family, but by virtue of being designated a sub-family all changes to any network security devices within the sub-family would be promulgated from cooperative security fabric root services device 802, and not directly implemented in a particular network security device within the sub-family.

Once security objects are available, they are distributed to the respective network security devices 806 in cooperative security fabric 800. In some embodiments, a family security policy uses an interface pair firewall policy configuration, where the network administrator specifies FGNAME::interface as its incoming and outgoing interfaces. In such embodiments, the network administrator specifies incoming and outgoing points of cooperative security fabric 800, the root node calculates child nodes that are relevant to the particular security policy (i.e., security policy participants), and respective incoming and/or outgoing interfaces. Once identified, the security objects are distributed from the root node to the destination nodes using the communication paths of cooperative security fabric 800.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance" or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for providing network security across a plurality of cooperative security fabrics. Such methods include: receiving, by a processing resource associated with a cloud based cooperative security fabric root services device, a security rule relevant to at least a first cooperative security fabric. The cloud based cooperative security fabric root services device is communicably coupled to at least the first cooperative security fabric and a second cooperative security fabric. The methods further include: selecting, by the processing resource, at least a first network security device and a second network security device within the first cooperative security fabric in which the security rule will be implemented; creating, by the processing resource: a first security message specific to the first network security device, wherein the first security message includes an instruction to implement a first portion of the security rule on the first network security device; and a second security message specific to the second network security device, wherein the second security message includes an instruction to implement a second portion of the security rule on the second network security device. The methods further include: transmitting, by the processing resource: the first security message to the first network security device via the first cooperative security fabric; and the second security message to the second network security device via the first cooperative security fabric.

In some instances of the aforementioned embodiments where the security rule is further relevant to the second cooperative security fabric, the methods further include: selecting, by the processing resource, at least a third network security device within the second cooperative security fabric in which the security rule will be implemented; and creating, by the processing resource, a third security message specific to the third network security device. The third security message includes an instruction to implement at least a portion of the security rule on the third network security device. In various instances of the aforementioned embodiments, the cloud based cooperative security fabric root services device is not tasked with implementing security protocols for either the first cooperative security fabric or the second cooperative security fabric.

In some instances of the aforementioned embodiments, the first cooperative security fabric includes an end node through which all communication between the first cooperative security fabric and the cloud based cooperative security fabric root services device passes. In some cases the end node may be, but is not limited to, a secure access service edge device, or a zero trust network access device.

In various instances of the aforementioned embodiments, the cloud based cooperative security fabric root services device includes a machine learning module configured to monitor behaviors on the first cooperative security fabric that is applicable to the second cooperative security fabric. In some such instances, the methods further include: identifying, by the machine learning module executing on the processing resource, a security activity occurring on the first security fabric; based upon the identified security activity, selecting, by the processing resource, at least a fourth network security device within the second cooperative security fabric related to the identified security activity; and creating, by the processing resource, a fourth security message specific to the fourth network security device. The fourth security message includes an instruction to implement a security rule corresponding to the identified security activity. In some cases where the security activity is a first security activity, the methods further include: identifying, by the machine learning module executing on the processing resource, a second security activity occurring on the second security fabric; based upon the identified second security activity, selecting, by the processing resource, at least a fifth network security device within the first cooperative security fabric related to the identified second security activity; and creating, by the processing resource, a fifth security message specific to the fifth network security device. The fifth security message includes an instruction to implement a security rule corresponding to the identified second security activity.

Other embodiments provide systems for providing network security across a cooperative security fabric that include a cloud based cooperative security fabric root services device including a processing resource, and a non-transient computer readable medium coupled to the processing resource. The non-transient computer readable medium has stored therein instructions that when executed by the processing resource cause the processing resource to: receive a security rule relevant to at least a first cooperative security fabric, where the cloud based cooperative security fabric root services device is communicably coupled to at least the first cooperative security fabric and a second cooperative security fabric; select at least a first network security device within the first cooperative security fabric in which the security rule will be implemented; create a first security message specific to the first network security device, wherein the first security message includes an instruction to implement at least a portion of the security rule on the first network security device; and transmit the first security message to the first network security device via the first cooperative security fabric.

Yet other embodiments provide non-transitory computer readable media having therein instructions that when executed by a processing resource of a cloud based cooperative security fabric root services device cause the processor to: receive a security rule relevant to at least a first cooperative security fabric, where the cloud based cooperative security fabric root services device is communicably coupled to at least the first cooperative security fabric and a second cooperative security fabric; select at least a first network security device within the first cooperative security fabric in which the security rule will be implemented; create a first security message specific to the first network security device, wherein the first security message includes an instruction to implement at least a portion of the security rule on the first network security device; and transmit the first security message to the first network security device via the first cooperative security fabric.

Figure 1A:
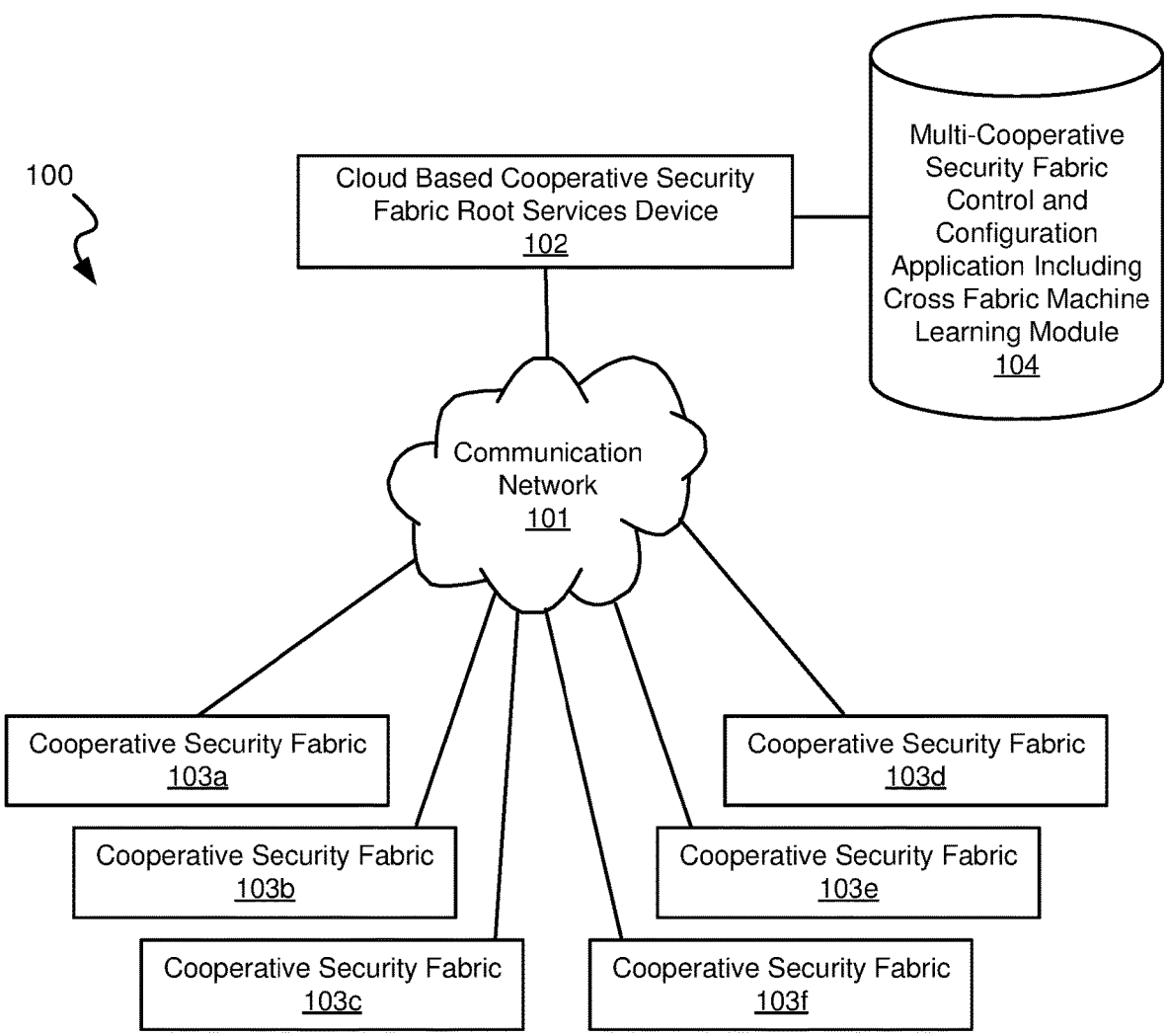
FIGS. 1A-1D illustrate a network architecture including a cloud based cooperative security fabric root services device configured to provide root services to multiple cooperative security fabrics in accordance with some embodiments.

Turning to FIG. 1A, a network architecture 100 is shown in accordance with some embodiments. As shown, network architecture 100 includes a number of cooperative security fabrics 103 (i.e., a cooperative security fabric 103a, a cooperative security fabric 103b, a cooperative security fabric 103c, a cooperative security fabric 103d, a cooperative security fabric 103e, and a cooperative security fabric 103O that are each controllable using a common cloud based cooperative security fabric root services device 102. As implied in the name, cloud based cooperative security fabric root services device 102 is a cloud based service accessible to one or more accessing devices via a communication network 101. Communication network 101 may be any type of communication network known in the art. Those skilled in the art will appreciate that, communication network 101 can be wireless network, a wired network, or a combination thereof that can be implemented as one of the various types of networks, such as an Intranet, a Local Area Network (LAN), and the like.

Cloud based cooperative security fabric root services device 102 does not have an upstream node, and may also be referred to interchangeably as the master network security device or root node. As discussed more fully in relation to FIG. 1B below, each of cooperative security fabrics 103 may include a number of nodes. Such nodes may include both an upstream node and one or more downstream nodes where cloud based cooperative security fabric root services device 102 is considered an upstream node for an endpoint of the particular cooperative security fabric 103. In some cases, the endpoint may be a network security device operating as a secure access service edge (SASE) device or a zero trust network access (ZTNA) device.

The nodes of the network security fabric are responsible for protecting respective local networks either by themselves or in concert with one or more other nodes in the respective cooperative security fabrics. In contrast, in some embodiments, cloud based cooperative security fabric root services device 102 is specifically not tasked with protecting any local network, but rather is used merely for configuring and/or monitoring respective cooperative network fabrics. By not combining cloud based cooperative security fabric root services device 102 into a particular network security device functioning within a specific network security fabric, the network security devices of the cooperative security fabric can be designed specifically for performing security functions. This allows for a more efficient implementation of a network security device.

Cloud based cooperative security fabric root services device 102 is coupled to a computer readable medium having stored thereon a multi-cooperative security fabric control and configuration application 104. Application 104 includes instructions executable by cloud based cooperative security fabric root services device 102 to dynamically construct and maintain cooperative security fabrics 103 in a recursive way based on the downstream-upstream relationships defined by the hierarchical interconnection of the network security devices within private networks overseen by each of the respective cooperative security fabrics 103. For example, network security devices included in each of the cooperative security fabrics 103 are reported to cloud based cooperative security fabric root services device 102. Such network security devices have cloud based cooperative security fabric root services device 102 as an upstream device and in some cases other network security devices as upstream devices. As network security devices are introduced to a cooperative security fabric and such additions are reported to cloud based cooperative security fabric root services device 102, cloud based cooperative security fabric root services device 102 has full information regarding the respective cooperative security fabric 103. Such information allows cloud based cooperative security fabric root services device 102 to communicate with individual network security devices within a particular cooperative security fabric 103, and to monitor each of the network security devices within the context of its cooperative security fabric 103. In some embodiments, cloud based cooperative security fabric root services device 102 is responsible for distributing security rules across multiple cooperative security fabrics 103 similar to that discussed below in relation to FIG. 6.

In some embodiments, multi-cooperative security fabric control and configuration application 104 includes a machine learning module. The machine learning module is configured to monitor activities on each of the respective cooperative security fabrics 103, and based upon the monitored information to determine whether approaches used on one of the cooperative security fabrics 103 is applicable to another of the cooperative security fabrics 103 and/or whether security problems being detected on one of the cooperative security fabrics 103 may be prophylactically addressed on other of the cooperative security fabrics 103. Such a machine learning module provides an ability to predictively generate security messages that can be directed by cloud based cooperative security fabric root services device 102 to one or more network security devices within one or more cooperative security fabrics to implement changes in security protocols applied by the respective network security fabrics. In some embodiments, the machine learning module allows for a degree of self-directed or automatically implemented security configuration enhancements based upon detected or identified activities in one or more of the cooperative security fabrics 103. In some embodiments, the machine learning module causes operation similar to that discussed below in relation to FIG. 7.

As noted above, cloud based cooperative security fabric root services device 102 and individual network security devices within a particular network security fabric 103 participate within the particular network security fabric in issuing queries to downstream network security devices participating within the cooperative security fabric 103. In one embodiment, however, the cooperative security fabric protocol precludes participating network security devices within the particular network security fabric 103 from issuing queries to upstream network security devices, cloud based cooperative security fabric root services device 102, or network security devices that are not downstream from the network security device at issue.

Figure 1B:
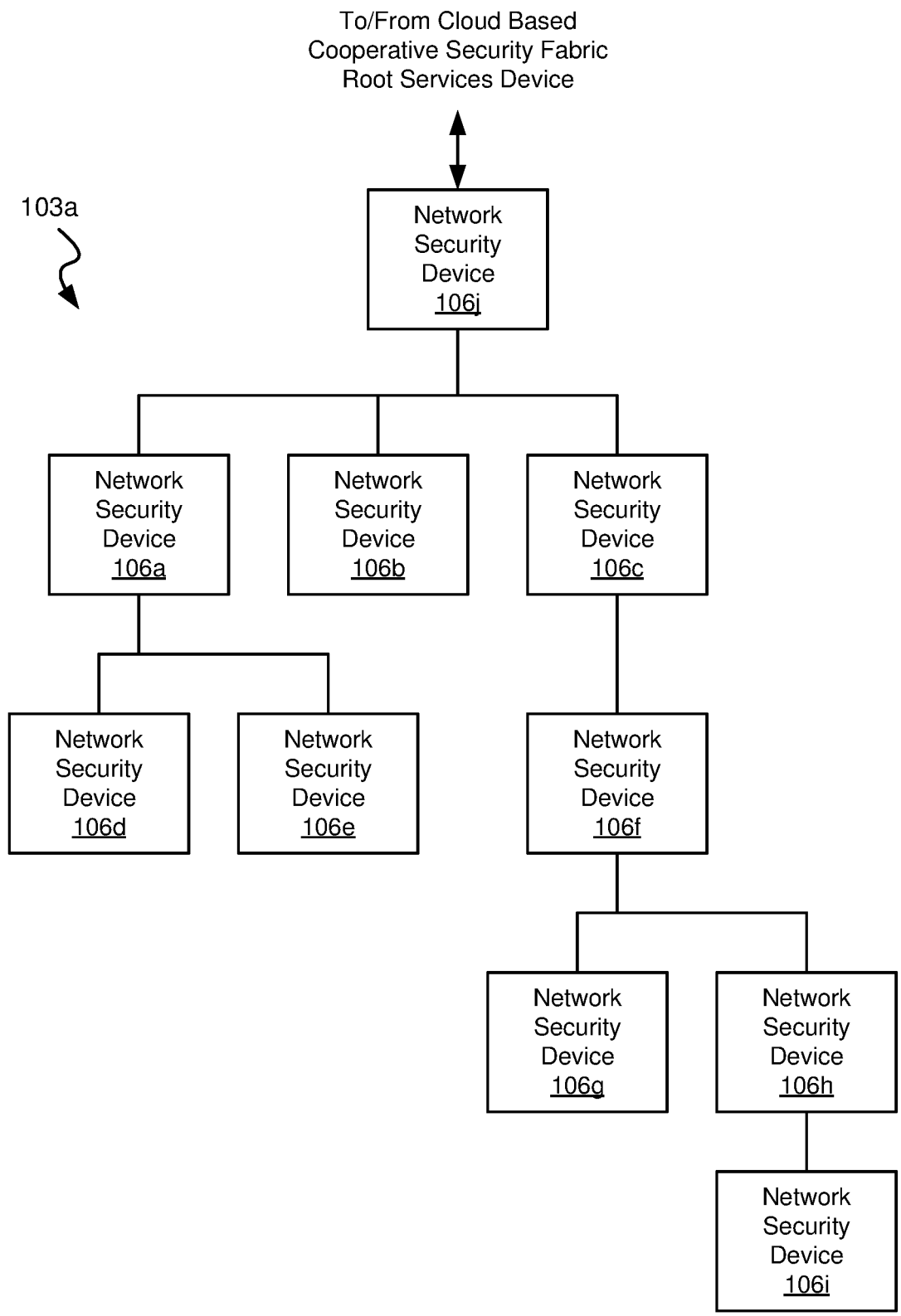

Turning to FIG. 1B, an example cooperative security fabric 103a is shown in accordance with some embodiments. As shown, example cooperative security fabric 103a includes a network security device 106j that operates as an endpoint or entry point for a private network overseen by network security fabric 103a. In some embodiments, network security device 106j may be a network security device operating as a secure access service edge (SASE) device or a zero trust network access (ZTNA) device. Network security device 106j is communicably coupled to cloud based cooperative security fabric root services device 102 (not shown). In such a configuration, network security device 106j performs security functions specifically assigned thereto, but does not perform monitoring or configuration functions that would be performed by a root node in a cooperative security fabric. Rather, such monitoring and configuration functions are performed by cloud based cooperative security fabric root services device 102 (not shown).

As shown in this example, cooperative security fabric 103a includes a number of interconnected network security devices 106 (i.e., a network security device 106a, a network security device 106b, a network security device 106c, a network security device 106d, a network security device 106e, a network security device 106f, a network security device 106g, a network security device 106h, a network security device 106i, and a network security device 106j). Multiple of network security devices 106 are considered intermediate nodes (network security device 106a, network security device 106c, network security device 106f, network security device 106h, and network security device 106j) as they include both an upstream node another network security device 106 or cloud based cooperative security fabric root services device 102 in the case of network security device 106j) and one or more downstream nodes. Multiple of network security devices 106 are considered leaf nodes (network security device 106b, network security device 106d, network security device 106e, network security device 106g, and network security device 106i) as they include an upstream node but no downstream node. Each of the intermediate nodes may be aware of downstream network topology, along with being aware of its connected downstream network security devices, and its upstream node. For instance, network security device 106j would be aware of the entire network topology, whereas network security device 106a would only be aware of its downstream nodes (i.e., network security device 106d and network security device 106e) and its upstream node (i.e., network security device 106j). Each of the network security devices 106 may be responsible for protecting respective local networks (not shown) either by themselves or in concert with one or more other network security devices.

As noted above, network security devices 106 participating within the cooperative security fabric are permitted to issue queries to downstream network security devices participating within the cooperative security fabric. As such, network security device 106a may issue a query to either or both of network security device 106d and network security device 106e. In one embodiment, however, the cooperative security fabric protocol precludes participating network security devices 106 from issuing queries to upstream network security devices or network security devices that are not downstream from the network security device at issue. For example, in an embodiment in which such limitations are enforced by the cooperative security fabric protocol, network security device 106a would not be permitted to issue a query to any of network security device 106j, network security device 106b, network security device 106c, network security device 106f, network security device 106g, network security device 106h, or network security device 106i.

Nodes (e.g., network security devices 106) within the cooperative security fabric can distinguish between being a leaf node and a root node in a number of ways, including whether they are directly coupled to more than one other node and whether they have a direct WAN connection. In addition to the permissible actions allowed to be performed by upstream network security devices (e.g., performing resource optimization for a downstream network security device and/or management of a downstream network security device), the master network security device has knowledge of the entire topology of the private network (not shown) within which the cooperative security fabric is formed.

In an example implementation, cooperative security fabric 103a can be built in such a manner that each node of the cooperative security fabric can request information regarding its downstream nodes and can send a query that may include an address of the destination node, a path to be followed from the source node (i.e., the node from which the query is originated) to the destination node, and query data. Each intermediate node network security device of the cooperative security fabric may be aware of its parent network security device and child network security device(s). In the context of the present example, network security device 106f would be aware of its upstream network security device 106c, and of its downstream network security devices 106g, 106h.

In an example implementation, each node of cooperative security fabric 103a may include one or more daemons, including a backend daemon and a forward daemon. In an exemplary implementation, the backend daemon running within a particular network security 106 can establish/create bidirectional tunnels between (i) the particular network security device and its upstream node, if any; and (ii) the particular network security device and each of its downstream nodes, if any. Further details regarding tunnel creation are described below with reference to FIG. 4 below. Each bidirectional tunnel can be configured to allow an upstream node/network security device to query a downstream node/network security device that it is connected to through the tunnel. Such a tunnel, in one exemplary configuration, can restrict the downstream node/network security device from sending queries to its upstream node/network security device. In general, when an upstream network security device queries a downstream network security device, the query is passed from the forward daemon of the upstream network security device (which may be referred to herein as an "uplevel daemon") to the backend daemon of an intermediate network security device, if any, (which may be referred to herein as a "downlevel daemon") and ultimately to the destination network security device. When the query reaches the destination network security device, the query is processed by the local backend daemon of the destination network security device. In this manner, queries may propagate downward toward the destination network security device in a recursive manner passing through the various intermediate uplevel and downlevel daemons as described further below. Similarly, responses to queries may propagate upward toward the originating network security device in a recursive manner passing through various intermediate downlevel and uplevel daemons.

For purposes of illustration, when network security device 106c queries network security device 106h, a first tunnel that has been created between network security device 106c and network security device 106f is initially used to pass the query from the forward daemon of network security device 106c to the backend daemon of network security device 106f. Then, the query is further passed from the forward daemon of network security device 106f to the backend daemon of network security device 106h via the tunnel established between network security device 106f and network security device 106h. Finally, at the destination (i.e., network security device 106f), the query is handled by local backend daemon.

In alternative embodiments, the communication channel between directly connected network security devices 106 can be implemented as two separate unidirectional tunnels, one for issuing commands, queries and/or keep-alive messages from an upstream node to a downstream node and one for returning responses to such commands, queries and/or keep-alive messages. Furthermore, while in the examples described herein, queries are described as flowing in a downstream direction, in some embodiments, downstream nodes may be allowed to query or update upstream nodes in one or more defined circumstances. For example, in one embodiment, responsive to accepting a join request from a new network security device 106, the network security device 106 that has integrated the new network security device 106 into its subtree may provide a topology update regarding its subtree to its parent via the tunnel connecting the two. In one embodiment, this topology update may be propagated all the way to cloud based cooperative security fabric root services device 102 of cooperative security fabric 103a.

In an example implementation, the backend daemon running within each network security device 106 of the cooperative security fabric can be configured to create a tunnel or virtual link, for example, a tunnel (not shown), between the upstream network security device 106c and downstream network security device 106f and handle one or more exceptions, if any. Backend daemon may also provide an Application Programming Interface (API), for example a Representational State Transfer (REST) or RESTful API, to the uplevel daemon to enable queries to be received and processed by the backend daemon. In an example implementation, each network security device 106 of the cooperative security fabric may have a forward daemon that is configured to enable query initiation and response processing. The forward daemon can initiate a query, which may include a destination address, a complete path from the source node to the destination node, for example, indicating the addresses of all intermediate nodes through which the query is to pass, and query data. As described in further detail with reference to FIG. 3, each intermediate node, upon receiving a query, identifies whether the query is destined to it and, if so, can accordingly process the query; otherwise, the intermediate node can forward the query towards the destination node based on the path defined in the query.

The bidirectional tunnels represented by the connections between the network security devices 106 in the cooperative security fabric may be established during construction of the cooperative security fabric. Alternatively, they may be established on demand. In an example implementation, when a query is initiated by an uplevel daemon, the backend daemon of the source network security device can create the required tunnel between the source network security device and the next network security device, and similarly subsequent required tunnels can be created by other intermediate network security device(s) between themselves and their direct downstream network security device. When a query arrives at the destination node, the backend daemon of the destination node can send the query by making an appropriate call via the local RESTful API and wait for the response. The destination network security device can then generate a response, which can be proxied back to each upstream device until it reaches the source network security device. As those skilled in the art will appreciate, no path is required for a response as each node of the cooperative security fabric can only have one upstream network security device 106. As such, a response can simply be propagated upstream until it reaches the source network security device 106 that issued the corresponding query.

In an example implementation, for a given tree such as the cooperative security fabric 103*a*, a group name and password associated with the cooperative security fabric can be used to allow a new network security device 106 to join the cooperative security fabric and authenticate itself to its parent. In order to join the cooperative security fabric, a new network security device 106 may send a join request, including the group name and password to the Internet Protocol (IP) address of its parent. Responsive to receipt of the join request, the upstream network security device 106 verifies the group name and password, and upon successful verification, the backend daemon of the upstream network security device 106 may establish a bidirectional tunnel with the new network security device 106 and update the subtree rooted at itself to include the new network security device 106. As described further below, the tunnel is used for periodic keep-alive messages between upstream network security devices and downstream network security device and for on-demand query messages from upstream to downstream.

In one embodiment, rather than reporting a topology change upstream toward cloud based cooperative security fabric root services device 102 through the cooperative security fabric responsive to acceptance of a join request, upstream network security devices 106 can request topology information associated with the subtree of a downstream network security device 106 on demand, for example, responsive to a network administrator requesting a refresh of a graphical user interface presented by the root network security device. For instance, with respect to FIG. 1B, a new network security device (not shown) can send a join request to become a part of the cooperative security fabric to network security device 106*b*, which upon, authentication and verification, can add the new network security device as its downstream node. At a later time, responsive to a query by cloud based cooperative security fabric root services device 102 requesting topology information, network security device 106*b* can provide topology information regarding its subtree. Alternatively, information about integration of a new network security device can be passed up to cloud based cooperative security fabric root services device 102, which can then broadcast the information to other network security devices 106 participating in the cooperative security fabric.

In an example implementation, cloud based cooperative security fabric root services device 102 can request information regarding the entire topology of the cooperative security fabric by sending a query requesting topology information regarding the subtrees of each of its downstream nodes. Upstream network security devices can be aware of the identity of each network security device, its type, capabilities, resources etc. and tunnel/virtual links. Identity of each network security device, its type, capabilities, resources etc. and the tunnel/virtual links created between the network security devices can be transparent.

Security in such a cooperative security fabric previously required a network administrator to implement security protocols for each network security device 106 in the cooperative security fabric. Embodiments discussed herein provide systems and methods to apply a unified or family security policy across relevant network security devices. The systems and methods use the topology of cooperative security fabric both to identify modifications required to individual network security devices 106 within the cooperative security fabric to implement the family security policy, and use the communication mechanisms between individual network security devices 106 within the cooperative security fabric to distribute and apply the identified modifications. Control of such configuration is provided by an intent based cooperative security fabric implementation and configuration application 104 including instructions that when executed by a processing resource on cloud based cooperative security fabric root services device 102 causes the configuration to be performed.

In some embodiments, a family mode may be initiated for the cooperative security fabric 103*a*. This may be done, for example, by selecting family mode on a user interface. When family mode is selected, all network security devices 106 included in the cooperative security fabric 103*a* are switched to family mode, and no network security device 106 allows direct changes to security processes implemented by the network security device. Rather, changes to security processes implemented by the network security device 106 are only accepted from cloud based cooperative security fabric root services device 102 (either directly or via one or more intervening intermediate network security devices 106). In some cases, direct changes to security processes of a given network (i.e., by a network administrator directly accessing the given network security device) is precluded by normally available device access invisible. Alternatively, where family mode is not selected, direct changes to security settings on the network security devices 106 of the cooperative security fabric via standard mechanisms.

In family mode when a security policy change is made by providing an indication of the security policy to the root node. In some embodiments, the indication of the security change is an intent based description of the security policy. Such an intent based security policy is translated into security settings (i.e., security objects or messages) individualized for relevant network security devices 106 in the cooperative security fabric. Any system and/or method for translation from intent based description to hardware specific implementation may be used in relation to embodiments discussed herein. In other embodiments, the indication of the security change includes specific changes (i.e., security objects or messages) individualized for each relevant network security device 106 in the cooperative security fabric. Such an approach does not require translation from intent to hardware specifics, but requires more of a network administrator.

Once security objects or messages are available, they are distributed to the respective network security devices 106 in the cooperative security fabric. In some embodiments, a family security policy uses an interface pair firewall policy configuration, where the network administrator specifies FGNAME::interface as its incoming and outgoing interfaces. In such embodiments, the network administrator specifies incoming and outgoing points of the cooperative security fabric, cloud based cooperative security fabric root services device 102 calculates downstream network security devices 106 that are relevant to the particular security policy (i.e., security policy participants), and respective incoming and/or outgoing interfaces. Once identified, the security objects are distributed from cloud based cooperative security fabric root services device 102 to the destination network security devices 106 similar to that discussed below in relation to FIG. 2.

Figure 1C:
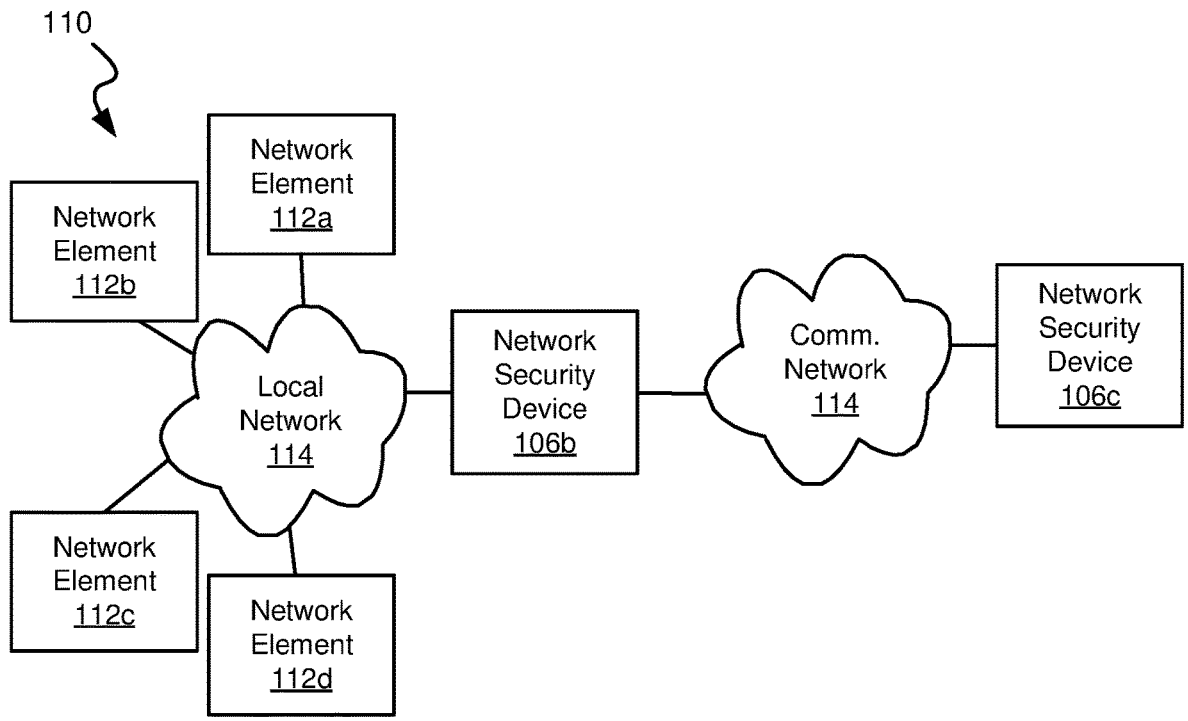

Turning to FIG. 1C, a subset of the cooperative security fabric 103*a* of FIG. 1B is shown that includes network security device 106*b* and network security device 106*c*. As shown, network security device 106*b* protects a local network 114 connecting a number of network elements 112 (i.e., a network element 112*a*, a network element 112*b*, a network element 112*c*, and a network element 112*d*). Network security device 106*b* is coupled to network security device 106*c* via a communication network 114. It is noted that this is a mere example, and that one of ordinary skill in the art will recognize a variety of connectivity between network security devices 106 and purposes of network security devices that may be used in relation to different embodiments.

Figure 1D:
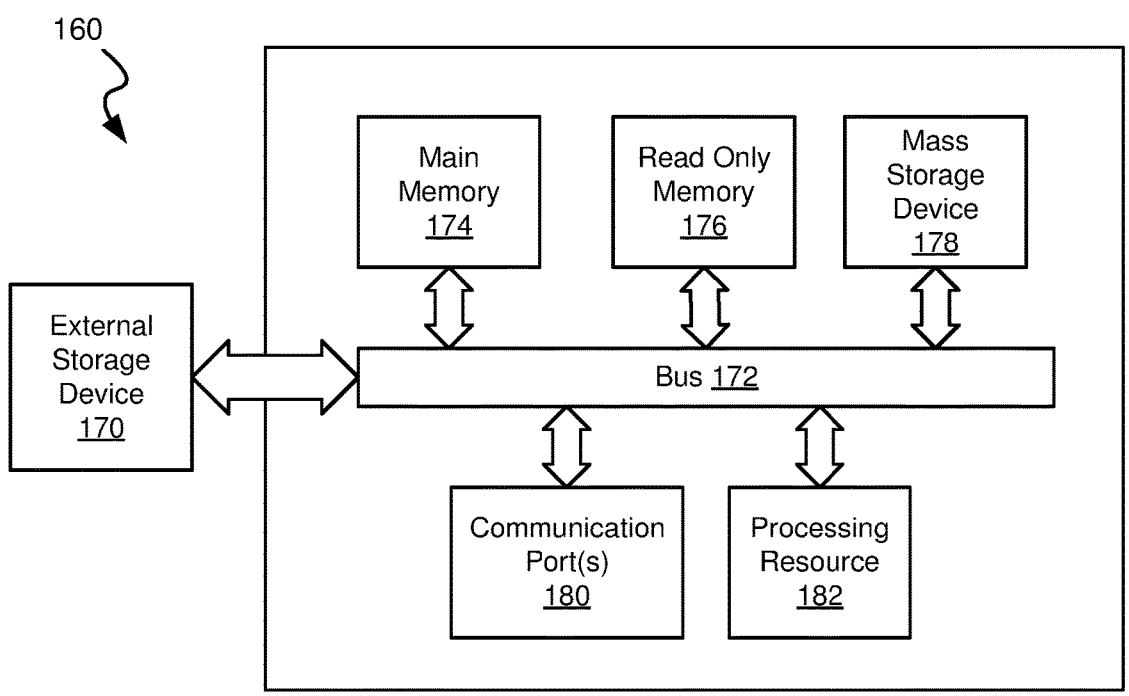

Turning to FIG. 1D, an example computer system 160 is shown in which or with which embodiments of the present disclosure may be utilized. As shown in FIG. 1D, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 112 and/or network security devices 106.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
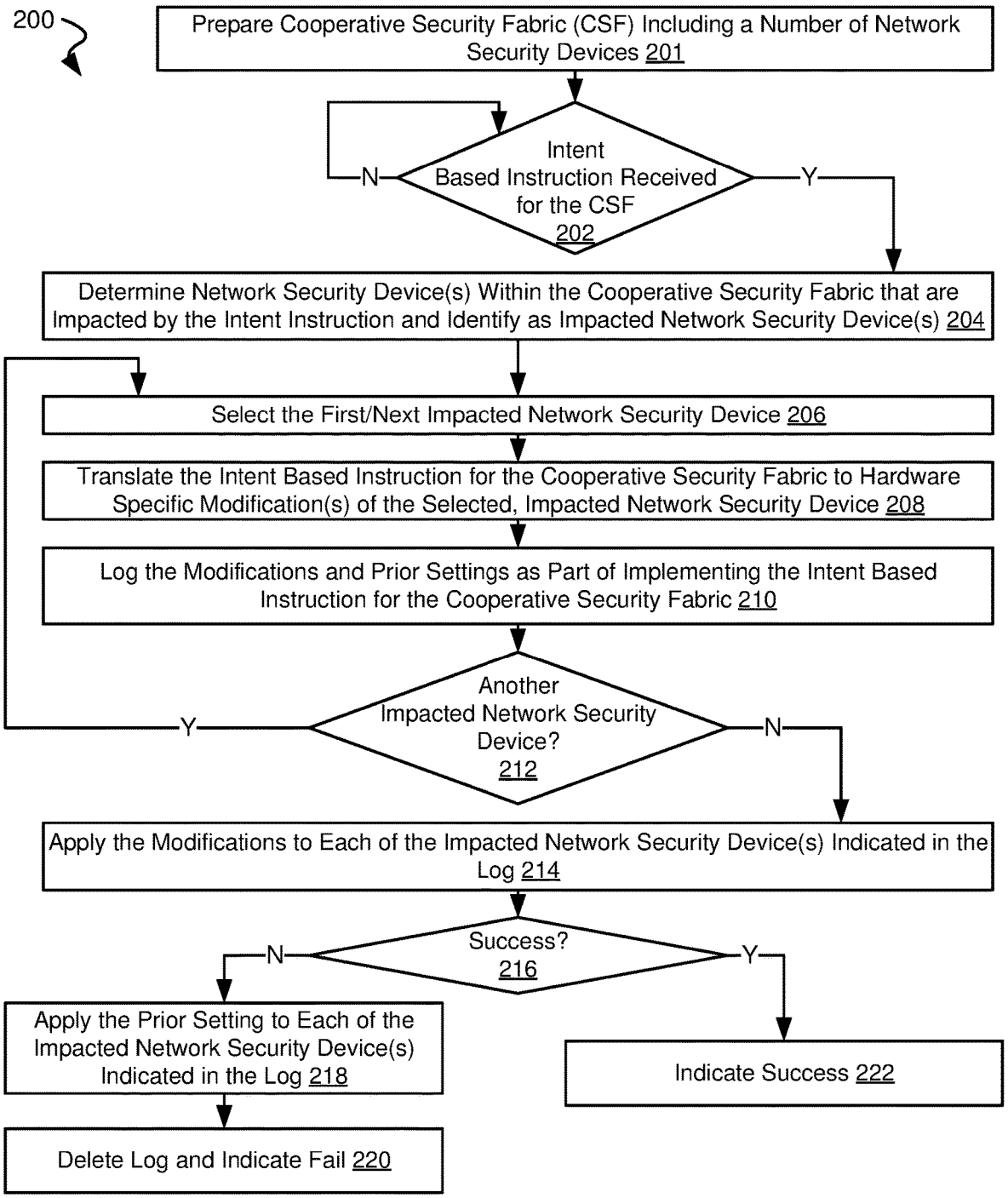
FIG. 2 is a flow diagram showing a method in accordance with some embodiments for implementing and configuring a cooperative security fabric.

Turning to FIG. 2, a flow diagram 200 shows a method in accordance with some embodiments for implementing and configuring a cooperative security fabric. Following flow diagram 200, a cooperative security fabric is prepared that includes a number of network security devices (block 201). The cooperative security fabric may include a cloud based cooperative security fabric root services device as its root node. The cooperative security fabric is prepared by establishing communication paths from each of the network security devices in a tree. In the tree, one of the network security devices that only has downstream nodes but no upstream nodes is designated as a root node. Other network security devices that do not have any downstream nodes are designated as leaf nodes, and yet other network security devices that include an upstream node and at least one downstream node are designated as intermediate nodes. Processing of communications between the nodes may be done as described below in relation to FIGS. 3-5. Based upon the disclosure provided herein, one of ordinary skill in the art will recognize a variety of topologies of cooperative security fabrics and communication protocols between network security devices in the cooperative security fabric that may be used in relation to different embodiments.

It is determined whether an intent based instruction is received for the cooperative security fabric (block 202). This intent based instruction is received by the root node in the cooperative security fabric and may be any instruction indicating a security policy that is to be implemented in relation to the cooperative security fabric. As an example, an intent based instruction may indicate that access to internet gambling sites or internet pornography sites are to be blocked. As another example, an intent based instruction may indicate that a given employee may access a particular subset of networks protected within the cooperative security fabric. As yet another example, an intent based instruction may indicate that access to internet gambling sites are to be blocked, except for accesses by a defined subset of employees using a particular subset of networks protected within the cooperative security fabric. Based upon the disclosure provided herein, one of ordinary skill in the art will recognize a variety of intent based instructions that may be received in relation to different embodiments.

In some embodiments, the intent based instruction is entered using one or more user interfaces that, once the cooperative security fabric is placed in family mode, allow a network administrator to select one or more security policies that are to be implemented for the entire cooperative security fabric. Based upon the disclosure provided herein, one of ordinary skill in the art will recognize a variety of user interfaces that may be used to provide for entry of security policies for the cooperative security fabric.

Where an intent based instruction has been received (block 202), the root node determines which network security devices within the cooperative security fabric are impacted by the instructions (block 204). As an example, where the intent based instruction indicates that access to internet gambling sites are to be blocked except for accesses by a defined subset of employees using a particular subset of networks protected within the cooperative security fabric, all network security devices providing internet access are impacted. In some cooperative security fabrics, this could be all network security devices. To limit the extent to which a policy is propagated, in some embodiments, only the network security devices that are closest to the endpoints for which the security policy is being implemented are considered impacted.

Further, for any security policy change, all network security devices that are along a route impacted by the by the intent based instruction that need to be changed are considered impacted. Thus, using the embodiment of FIG. 1A as an example, for a security policy that requires interaction of all network security devices along a route from an endpoint device serviced by network security device 106*e* to root network security device 102, network security device 106*e*, network security device 106*a*, and root network security device 102 are designated as impacted. Additionally, network address translation for traffic moving in the cooperative security fabric may be done only at the network security device that is last in the route. This allows for traffic to flow within the cooperative security fabric without requiring network address translation until the traffic exits the cooperative security fabric. To reduce complexity, in some embodiments traffic is only logged when the network address translation is performed. This reduces the number of logs that are sent to a network analyzer.

One of the identified, impacted network security devices is selected (block 206), and the intent based instruction is translated into modifications that are specific to the hardware/software of the selected network security device (block 208). Using the example above of an intent based instruction indicates that access to internet gambling sites are to be blocked except for accesses by a defined subset of employees using a particular subset of networks protected within the cooperative security fabric and the impacted network security devices were limited to network security devices closest to the endpoints for which the security policy is being implemented, it is determined whether the selected, impacted network security device services the defined subset of employees using the particular subset of networks for which access to gambling sites is allowed. Where the network security device does service this subset of users, a security policy is prepared that is specific to the hardware/software of the selected, impacted network security device that allows access to internet gambling sites for the defined subset of employees and disallows all other access to internet gambling sites. Alternatively, where the network security device does not service this subset of users, a security policy is prepared that is specific to the hardware/software of the selected, impacted network security device that disallows all access to internet gambling sites. The modifications and prior settings of the selected, impacted network security device are logged as part of implementing the intent based instruction for the cooperative security fabric (block 210).

It is determined whether another impacted network security device remains to be considered (block 212). Where another impacted network security device remains to be considered (block 212), the processes of blocks 206-212 are repeated for the next impacted network security device. Alternatively, where no other impacted network security device remain to be considered (block 212), the modifications are applied to each of the impacted network security devices within the cooperative security fabric (block 214). This includes forwarding messages specific to each impacted network security device from the root node of the cooperative security fabric. The messages cause the particular security policy to be implemented by the particular impacted network security device. The messages may be distributed according to the communication protocol discussed below in relation to FIGS. 1A and 3-5.

By way of messages propagating back to the root node, it is determined whether all of the messages were successfully received and the corresponding security policy was implemented on the respective impacted network security devices (block 216). Where the security policy was not successfully implemented (block 216), messages are generated to apply the original settings to each of the impacted network security devices as indicated in the log (block 218), the log is deleted, and a message is displayed by the root node via a user interface indicating the failure (block 220). Alternatively, where the security policy was successfully implemented (block 216), a message indicating success is displayed by the root node via a user interface (block 222)

Figure 3:
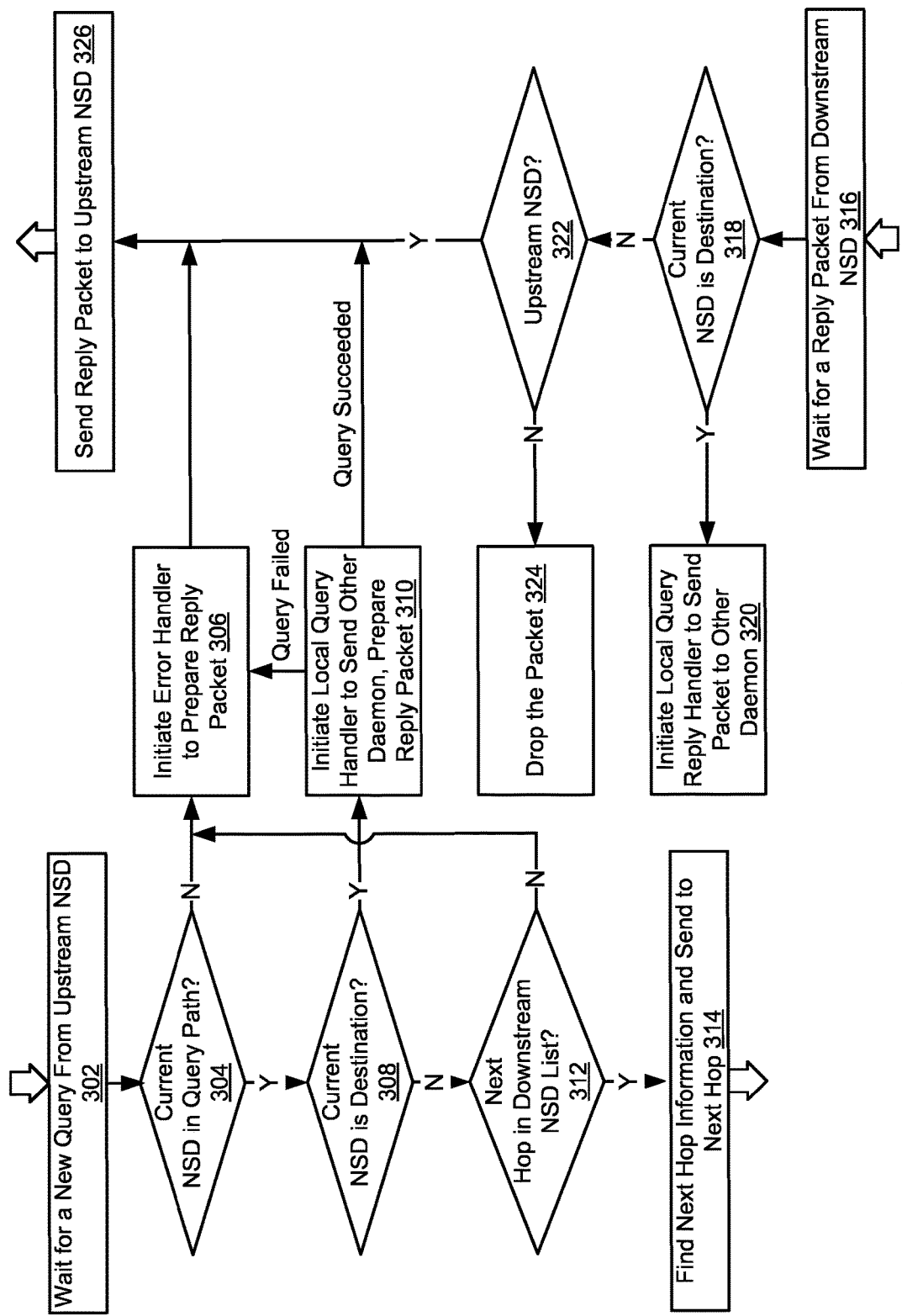
FIG. 3 is a flow diagram showing a method for query handling in relation to implementing a cooperative security fabric that may be used in relation to various embodiments.

FIG. 3 illustrates an exemplary flow of query handling by an network security device of a cooperative security fabric in accordance with some embodiments. According to one embodiment, each network security device implements two separate daemons—one, the forward daemon, which, among other things, issues queries to downstream network security devices and receives and routes responses to queries received from downstream network security devices, and another, the backend daemon, which, among other things, receives and processes queries from upstream network security devices (via a RESTful API, for example). In an exemplary implementation, each network security device can be configured to handle query and response packets based on the content of the respective packet and the specified query or return path. In an exemplary implementation, the response packet can include the destination address (which is the same as the source address of query packet), a return path including addresses of intermediate node(s)/hop(s)/network security device(s) through which it needs to be routed, along with the response data. In an exemplary implementation, return path and the query path can be same or different. In an exemplary implementation, communication between upstream and downstream network security devices can be enabled through a tunnel created by the current network security device.

Turning to FIG. 3, a flow diagram 300 shows a method for query handling in relation to implementing a cooperative security fabric that may be used in relation to various embodiments. Following flow diagram 300, a current or particular network security device can wait for a new query from an upstream network security device (block 302). A new query has a defined query path indicating the identities of intermediate network security devices, the destination network security device(s), and query data. When a new query is received (block 302), it is determined whether the current network security device is in the query path (block 304). When the particular network security device is in the query path (block 304), it is further determined whether the current network security device is the destination network security device (block 308).

Alternatively, where it is determined that the particular network security device is not in the query path (block 304), an error handler is initiated to prepare a reply packet corresponding to the new query (block 306), and the prepared reply packet is sent to the upstream network security device (i.e., the network security device that sent the new query)(block 326). Alternatively, where the current network security device is the destination network security device (block 308), a local query handler is instantiated to handle the query (block 310). The local query handler forwards a local forward daemon to prepare and send the reply packet upstream to the originator of the query (block 326). Alternatively, where the current network security device determines that it is not the destination network security device (block 308), the current network security device determines whether the next hop network security device in the query path is in its downstream network security device list (block 312). Where the current network security device determines that the next hop is in its downstream network security device list (block 312), it can find the next hop information and relay the query to the next hop/downstream network security device (block 314). Otherwise, the error handler is initiated to prepare a reply packet (block 306), and the prepared reply pack is sent to the upstream network security device (i.e., the network security device that sent the new query)(block 326).

In addition, the current network security device is configured to process response/reply packets received from a downstream network security device and make forwarding decisions to forward the responses/replies to an upstream network security device. In particular, the current network security device can wait for a reply packet to be received from a downstream network security device connected to the current network security device (block 316). Once received (block 316), it is determined whether the current network security device is the destination network security device for the received response (block 318). Where it is determined that the current network security device is the destination network security device (block 318), a local query reply hander is initiated to send the packet to the other daemon—the uplevel daemon—that is responsible for taking an appropriate action as discussed above (block 320). Otherwise, it is determined that the current network security device is an upstream network security device connected with the current network security device (block 322). Where it is determined that the current network security device does not have an upstream network security device connected thereto (block 322), the response packet is dropped (block 324). Alternatively, where it is determined that the current network security device does not have an upstream network security device connected thereto (block 322), the reply packet is forwarded to an upstream network security device (block 326).

Figure 4A:
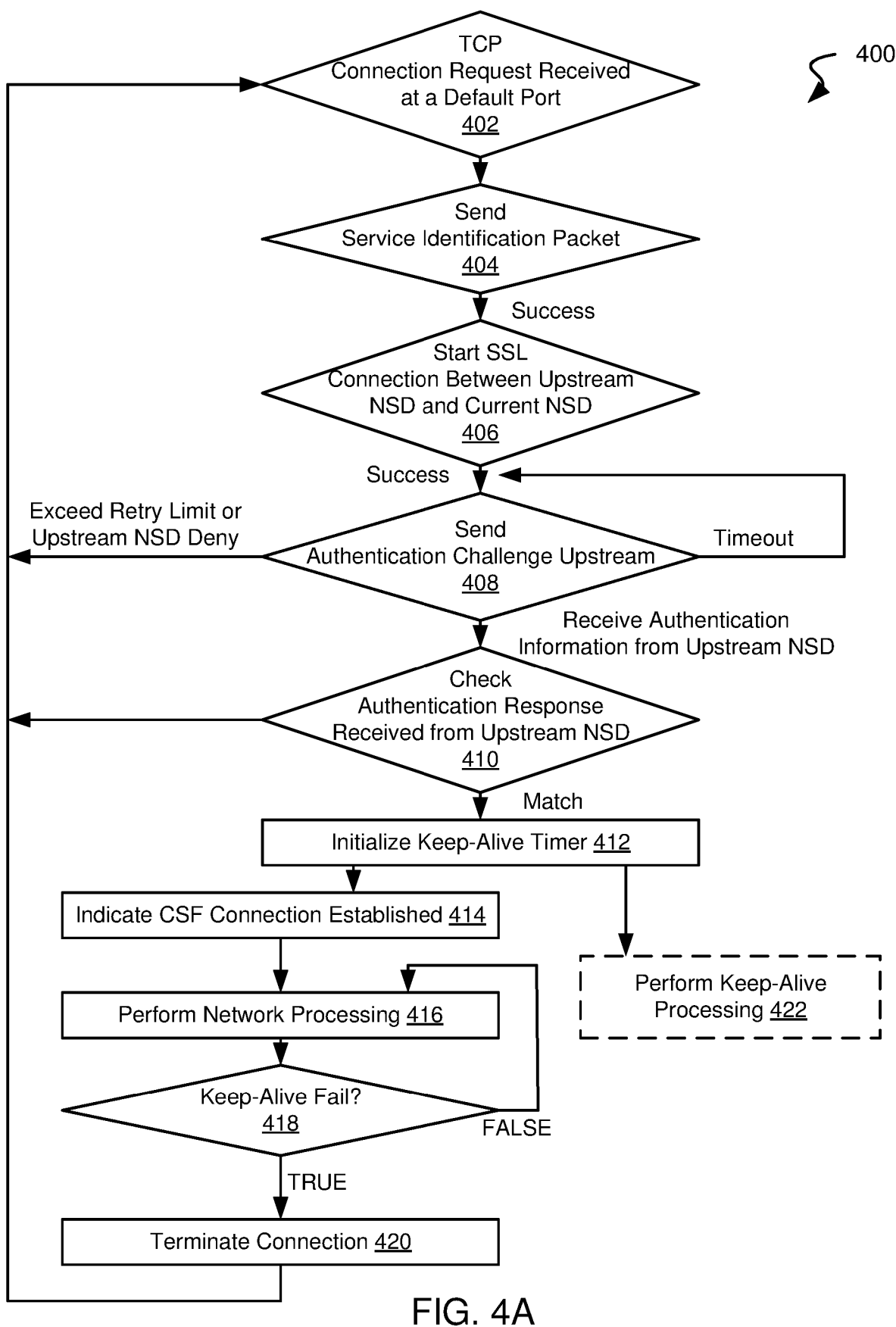
FIGS. 4A-4B are flow diagrams showing a method for implementing a tunnel between two network security devices from a downstream perspective that may be used in relation to some embodiments.
Figure 4B:
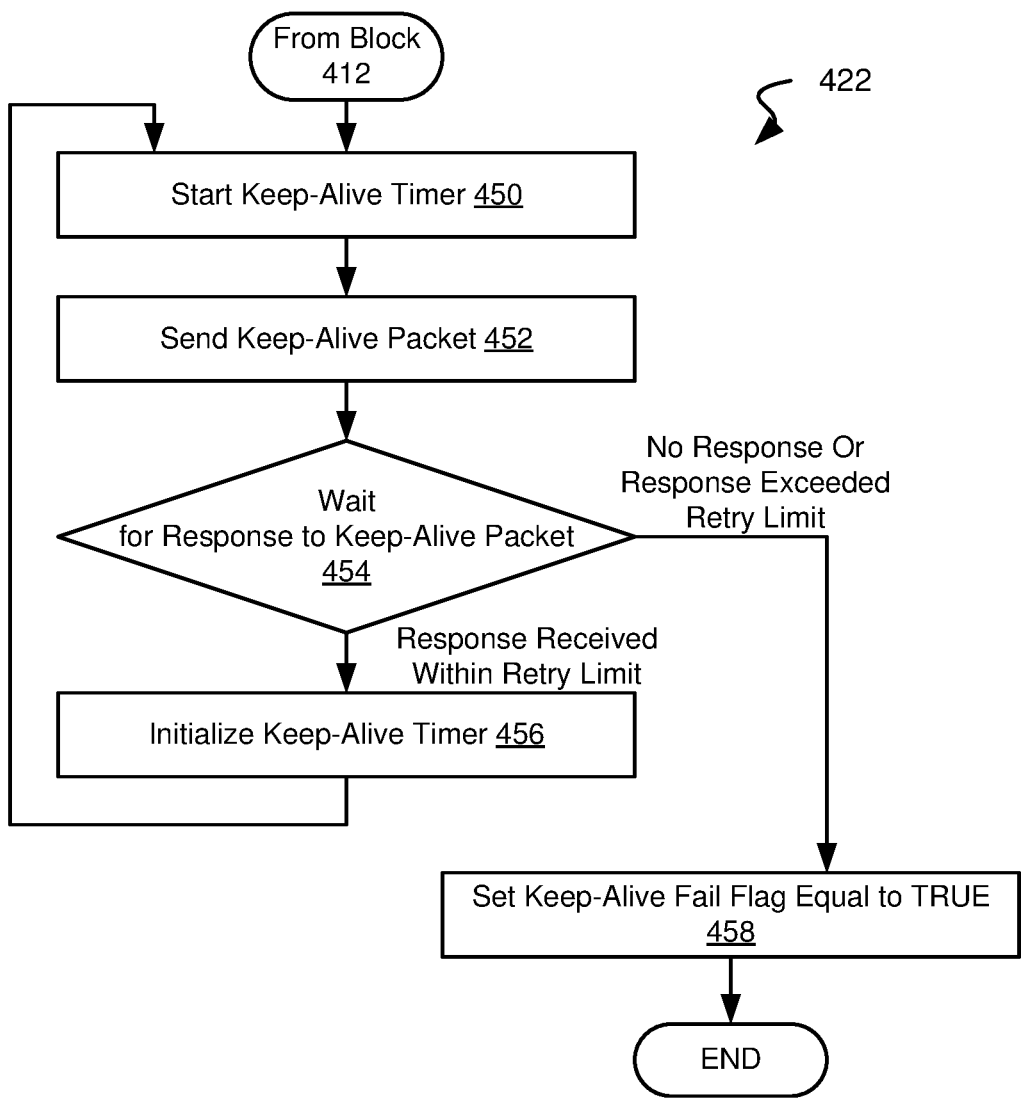

Turning to FIGS. 4A-4B, a flow diagram 400 shows a method for implementing a tunnel between two network security devices from a downstream perspective that may be used in relation to some embodiments. Following flow diagram 400, a network security device can be configured to listen for a Transmission Control Protocol (TCP) client connection request on a default port, for example port 8013 (block 402). Where a connection request is detected (block 402), the network security device sends a service identification packet (block 404). In some cases, the TCP client connection request may be generated by the uplevel daemon of the network security device or by a stream network security device. On successful identification of the service and compatibility of the network (block 404), the current network security device can start a Secure Sockets Layer (SSL) client connection between the network security device and the TCP client (block 406). The SSL client connection can be a new network security device or an upstream network security device. The network security device can send an authentication challenge to the TCP client, and wait for the TCP client to provide authentication details (for instance, including a group name for the cooperative security fabric and a corresponding password) (block 408). If the TCP client does not respond to the authentication challenge within a predefined timeout period associated with the authentication challenge (block 408), a timeout can occur and the network security device can resend the authentication challenge to the TCP client. Where the network security device does not receive a response or the authentication response is not accurate after the retry limit has been exceeded (block 408), the network security device can close the SSL connection between the TCP client and the network security device and close the TCP connection request. Alternatively, where the authentication response is received from the upstream network security device, the network security device can check authentication information received from the client device to verify authenticity of the client device (block 410). When the authentication information matches with the authentication credentials of the cooperative security fabric of which the network security device is a part (block 410), the network security device initializes a keep-alive timer (block 412), indicates that a cooperative security fabric connection has been established (block 414), and starts a keep-alive processing (block 422). Initializing the keep-alive timer includes setting a keep-alive fail flag equal to false and setting the keep-alive timer to zero. Block 422 is shown in dashed lines as it is represented by a flow diagram of the same number (i.e., flow diagram 422) that is described below in relation to FIG. 4B.

As discussed in more detail below in relation to FIG. 4B, the keep-alive fail flag is set equal to TRUE by the keep-alive processing (block 420). After connection (block 414), network processing continues until the aforementioned keep-alive fail flag is set equal to TRUE (block 418). Once the keep-alive fail flag is set equal to TRUE (block 418), the previously established cooperative security fabric connection is terminated (block 420).

Turning to FIG. 4B, a keep-alive timer is started (block 450) and a keep-alive packet is sent downstream (block 452). It is determined whether a response is received within a retry limit as defined by the keep-alive timer (block 454). Where a response is received within the defined limits (block 454), the keep-alive timer is re-initialized (block 456) and the keep alive process is repeated (blocks 450-456). Alternatively, where a response is not received within the defined limits (block 454), the keep-alive fail flag is set equal to TRUE (block 458) and the process ends. Again, when the keep-alive fail flag is set equal to TRUE, the cooperative security fabric connection is terminated as discussed above in relation to FIG. 4A.

Figure 5A:
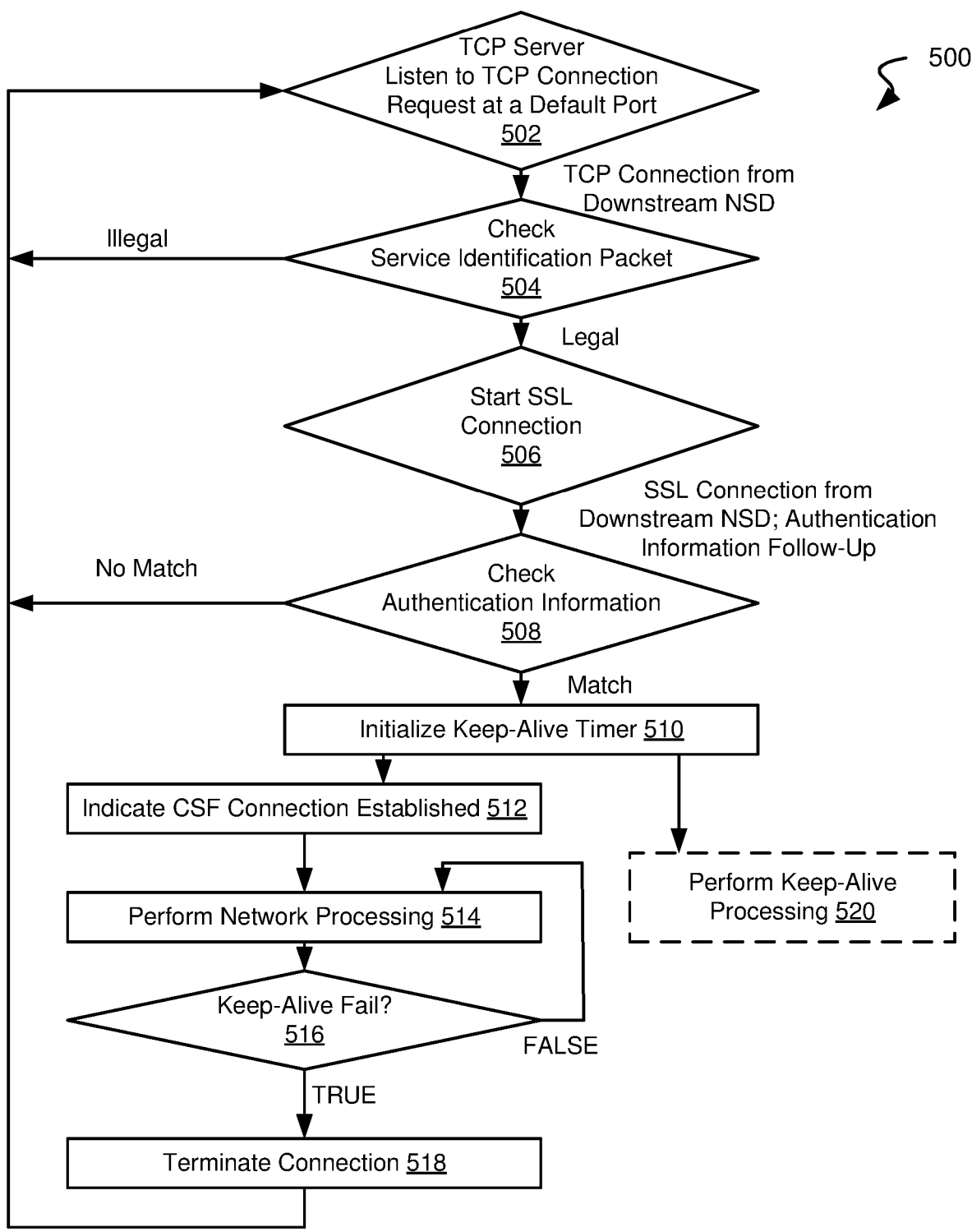
FIGS. 5A-5B are flow diagrams showing a method for implementing a tunnel between two network security devices from an upstream perspective that may be used in relation to some embodiments.
Figure 5B:
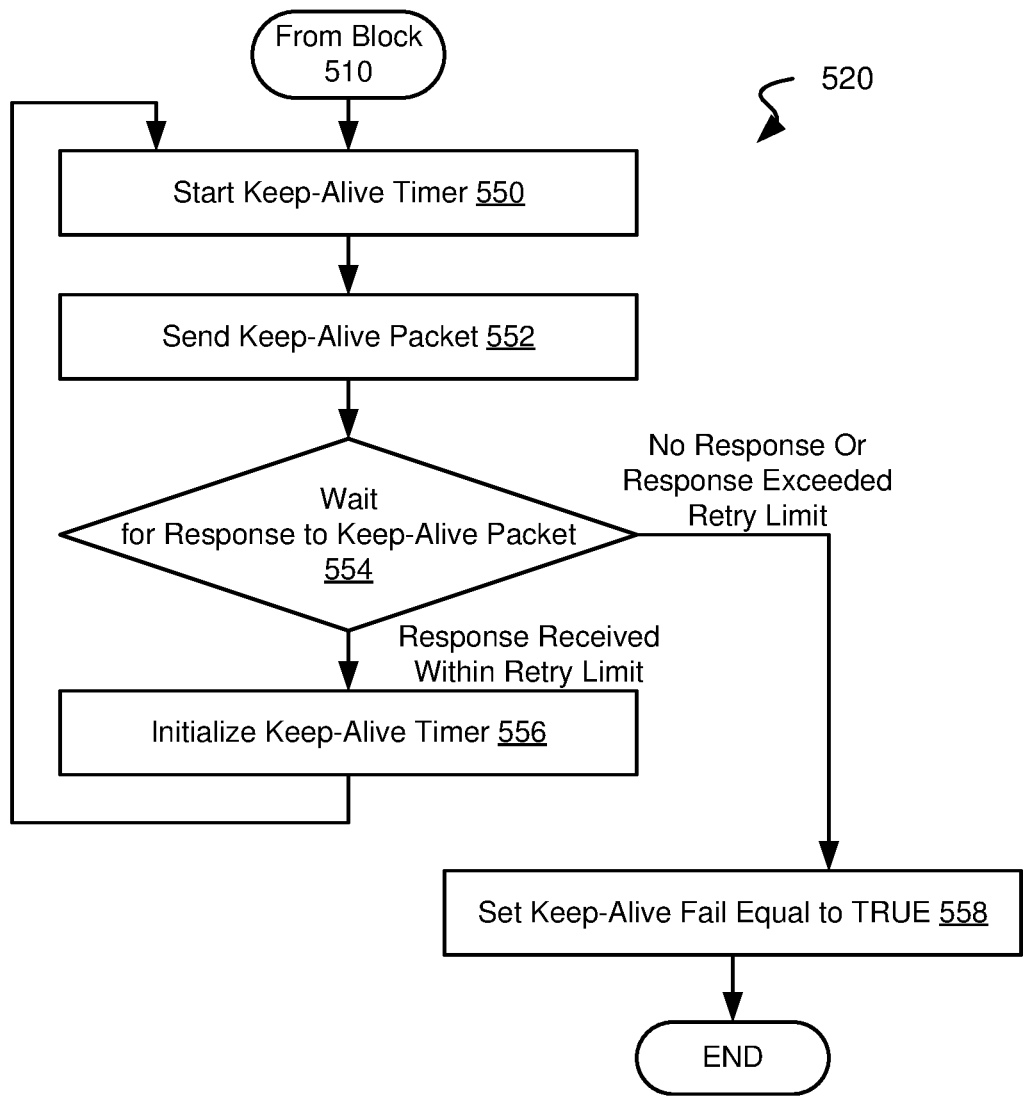

Turning to FIGS. 5A-5B, a flow diagram 500 shows a method for implementing a tunnel between two network security devices from an upstream perspective that may be used in relation to some embodiments. Following flow diagram 500, a TCP server, for example an network security device can be configured to listen to a TCP connection request from a downstream network security device, on a default port, for example port 8013 (block 502). Upon receiving the connection request from the downstream network security device, the network security device can check the service identification packet (block 504). If the service identification packet is legal (block 504), the network security device can start an SSL connection between the downstream network security device and the network security device (block 506). Alternatively, where the service identification packet is illegal (block 504), the connection can be closed by the network security device. After starting the SSL connection (block 506), the network security device can check if the authentication information received from the downstream network security device matches with the cooperative security fabric authentication credentials (block 508). Where the authentication information provided by the downstream network security device matches with the cooperative security fabric authentication credentials (block 508), the network security device initializes a keep-alive timer (block 510), indicates that a cooperative security fabric connection has been established (block 512), and starts a keep-alive processing (block 520). Initializing the keep-alive timer includes setting a keep-alive fail flag equal to false and setting the keep-alive timer to zero. Block 520 is shown in dashed lines as it is represented by a flow diagram of the same number (i.e., flow diagram 520) that is described below in relation to FIG. 5B.

Turning to FIG. 5B, a keep-alive timer is started (block 550) and a keep-alive packet is sent upstream (block 552). It is determined whether a response is received within a retry limit as defined by the keep-alive timer (block 554). Where a response is received within the defined limits (block 554), the keep-alive timer is re-initialized (block 556) and the keep alive process is repeated (blocks 550-556). Alternatively, where a response is not received within the defined limits (block 554), the keep-alive fail flag is set equal to TRUE (block 558) and the process ends. Again, when the keep-alive fail flag is set equal to TRUE, the cooperative security fabric connection is terminated as discussed above in relation to FIG. 5A.

Figure 6:
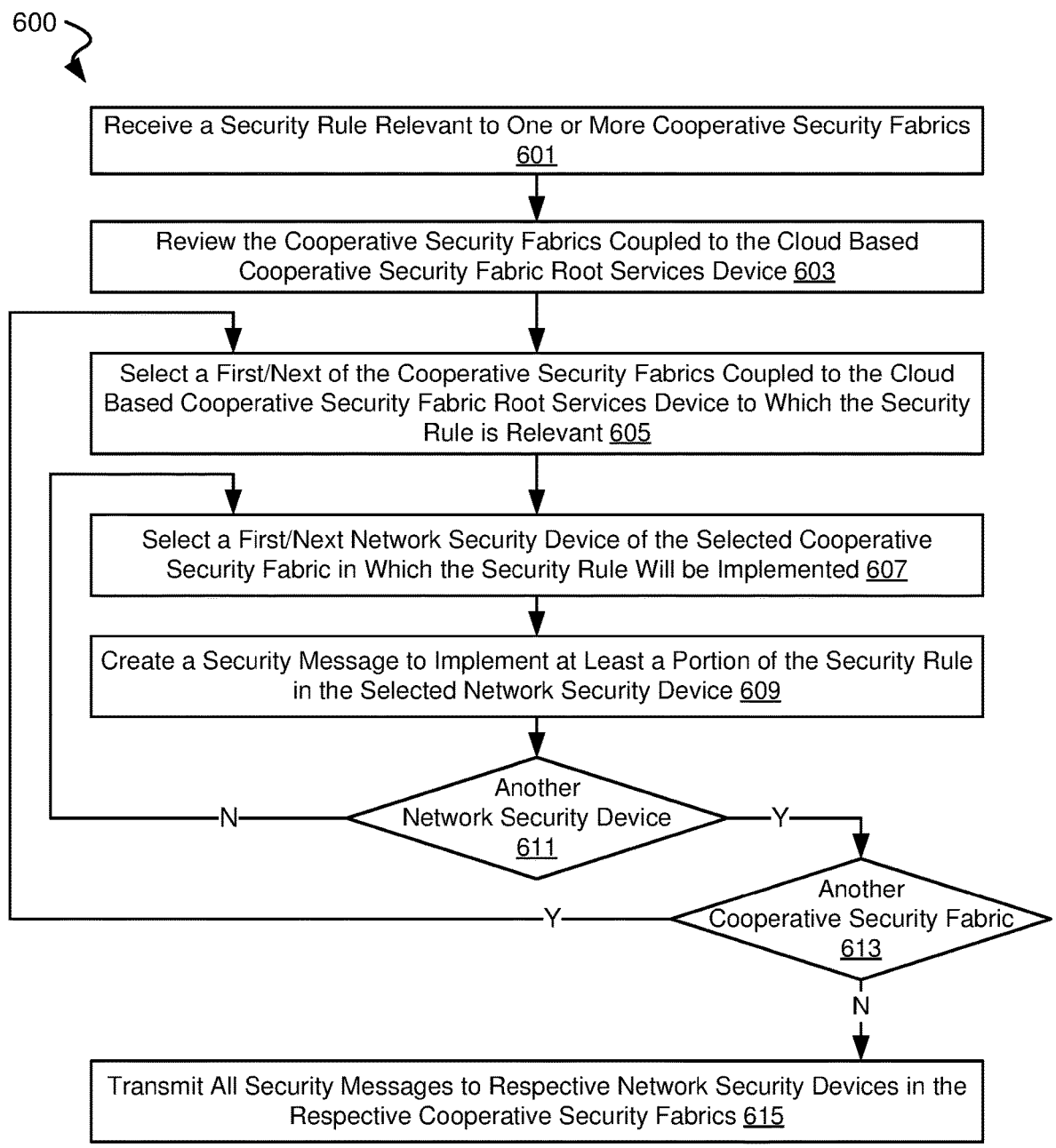
FIG. 6 is a flow diagram showing a method in accordance with some embodiments for distributing security rules across multiple cooperative security fabrics using a cloud based cooperative security fabric root services device.

Turning to FIG. 6, a flow diagram 600 shows a method in accordance with some embodiments for distributing security rules across multiple cooperative security fabrics using a cloud based cooperative security fabric root services device. Following flow diagram 600, a security rule relevant to one or more cooperative security fabrics is received (block 601). Such a security rule may be received, for example, via a user interface of a common cloud based cooperative security fabric root services device from a system administrator. Such a security rule may be any rule known in the art for addressing potential security concerns in a network.

The receiving device reviews one or more cooperative security fabrics that are communicably coupled to a cloud based cooperative security fabric root services device (block 603). Such a review includes determining whether the security rule is relevant to the particular cooperative security fabric, and to within which network security devices of the particular cooperative security fabric the security rule or portions thereof may be implemented.

A first/next of the cooperative security fabrics coupled to the cloud based cooperative security fabric root services device to which the security rule is relevant is selected (block 605), and a first/next network security device within the selected cooperative security fabric in which at least a portion of the security rule will be implemented is selected (block 607). A security message specific to the selected network security device is created (block 609). The security message when provided to the selected network security device will modify the network security device such that it will implement the security rule.

It is determined whether another network security device within the selected cooperative security fabric remains to be modified to implement the security rule (block 611). A security rule may be implemented in a particular cooperative security fabric by a single network security device, in which case only one security message is generated for the single network security device. In other cases, a security rule may be implemented by a number of network security devices operating in concert. In such a case, two or more network security devices may be modified to implement the security rule. Where another network security device remains to be modified to implement the security rule (block 611), the next network security device of the selected cooperative security fabric is selected and the processes of blocks 609-611 are repeated for the next network security device. This is repeated until security messages for all network security devices involved in implementing the security rule are generated.

Where no additional network security device remains to be modified to implement the security rule (block 611), it is determined whether another cooperative security fabric to which the security rule was found to be relevant remains to be processed (block 613). Where another cooperative security fabric remains to be processed (block 613), the next cooperative security fabric is selected and the processes of blocks 605-613 are repeated for the next cooperative security fabric. This is repeated until security messages for all network security devices involved in implementing the security rule across all cooperative security fabrics are generated.

Once all of the cooperative security fabrics to which the security rule is relevant have been processed (block 613), security messages for all network security devices within relevant cooperative security fabrics have been created. At this juncture (block 613), the created security messages are transmitted to the respective network security devices (block 615). Such transmission may be done using, for example, the processes discussed above in relation to FIG. 2. Once the messages have been transmitted and subsequently executed by the respective network security devices, the security rule has been implemented across all of the cooperative security fabrics to which the security rule was deemed relevant.

Figure 7:
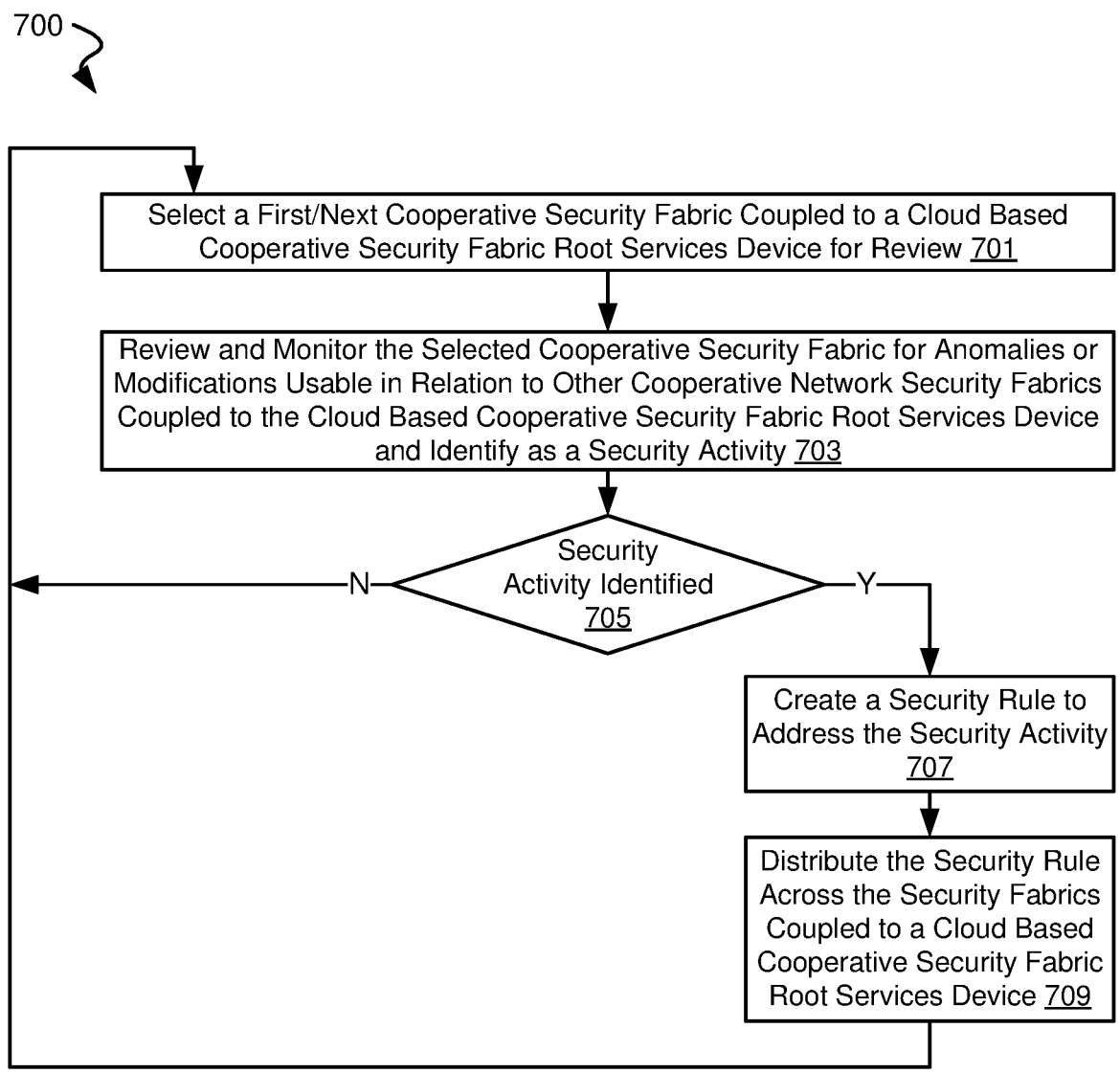
FIG. 7 is a flow diagram showing a method in accordance with various embodiments for employing a machine learning process to identify security activities in one cooperative security fabric, creating security rules corresponding to the identified security activities, and implementing corresponding security rules across multiple cooperative security fabrics using a cloud based cooperative security fabric root services device.

Turning to FIG. 7, a flow diagram 700 shows a method in accordance with various embodiments for employing a machine learning process to identify security activities in one cooperative security fabric, creating security rules corresponding to the identified security activities, and implementing corresponding security rules across multiple cooperative security fabrics using a cloud based cooperative security fabric root services device. Following flow diagram 700, a first/next of the cooperative security fabrics coupled to the cloud based cooperative security fabric root services device is selected for review (block 701). The review is designed to identify any anomalies occurring within the selected cooperative security fabric or modifications that have been made to the selected cooperative security fabric that may be usable in relation to other cooperative security fabrics coupled to the cloud based cooperative security fabric root services device. The review is performed and any detected anomalies or modifications are identified as security activities (block 703).

Where no security activities are identified (block 705), the next cooperative security fabric coupled to the cloud based cooperative security fabric root services device is selected (block 701) and the processes of blocks 703-705 are repeated for the next selected cooperative security fabric. Alternatively, where a security activity is identified (block 705), a security rule is created to address the identified security activity (block 707), and the security rule is distributed across multiple cooperative security fabrics to which the security rule is relevant (block 709). The distribution of the security rule may be implemented similar to that discussed above in relation to FIG. 6.

In conclusion, the disclosure provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for providing network security across a plurality of cooperative security fabrics, the method comprising:
receiving, by a processing resource associated with a cloud based cooperative security fabric root services device, a security rule relevant to at least a first cooperative security fabric, wherein the cloud based cooperative security fabric root services device is communicably coupled to at least the first cooperative security fabric and a second cooperative security fabric;
selecting, by the processing resource, at least a first network security device and a second network security device within the first cooperative security fabric in which the security rule will be implemented;
creating, by the processing resource:
a first security message specific to the first network security device, wherein the first security message includes an instruction to implement a first portion of the security rule on the first network security device; and
a second security message specific to the second network security device, wherein the second security message includes an instruction to implement a second portion of the security rule on the second network security device;
transmitting, by the processing resource:
the first security message to the first network security device via the first cooperative security fabric; and
the second security message to the second network security device via the first cooperative security fabric;
selecting, by the processing resource, a family mode for the first cooperative security fabric, wherein the family mode selection comprises: switching network security devices included in the first cooperative security fabric to the family mode; and
responsive to the family mode selection, changes to security processes for a respective network security device within the first cooperative security fabric are only accepted from the cloud based cooperative security fabric root services device.

2. The method of claim 1, wherein the security rule is further relevant to the second cooperative security fabric, the method further comprising:
selecting, by the processing resource, at least a third network security device within the second cooperative security fabric in which the security rule will be implemented;
creating, by the processing resource:
a third security message specific to the third network security device, wherein the third security message includes an instruction to implement at least one of the portions of the security rule on the third network security device.

3. The method of claim 1, wherein the cloud based cooperative security fabric root services device is not tasked with implementing security protocols for either the first cooperative security fabric or the second cooperative security fabric.

4. The method of claim 1, wherein the first cooperative security fabric includes an end node through which all communication between the first cooperative security fabric and the cloud based cooperative security fabric root services device passes.

5. The method of claim 4, wherein the end node is selected from a group consisting of: a secure access service edge device, and a zero trust network access device.

6. The method of claim 1, wherein the cloud based cooperative security fabric root services device includes a machine learning module configured to monitor behaviors on the first cooperative security fabric that is applicable to the second cooperative security fabric.

7. The method of claim 6, the method further comprising:
identifying, by the machine learning module executing on the processing resource, a security activity occurring on the first cooperative security fabric; and
based upon the identified security activity, selecting, by the processing resource, at least a fourth network security device within the second cooperative security fabric related to the identified security activity; and
creating, by the processing resource:
a fourth security message specific to the fourth network security device, wherein the fourth security message includes an instruction to implement a security rule corresponding to the identified security activity.

8. The method of claim 7, wherein the security activity is a first security activity, the method further comprising:
identifying, by the machine learning module executing on the processing resource, a second security activity occurring on the second cooperative security fabric;
based upon the identified second security activity, selecting, by the processing resource, at least a fifth network security device within the first cooperative security fabric related to the identified second security activity; and
creating, by the processing resource:
a fifth security message specific to the fifth network security device, wherein the fifth security message includes an instruction to implement a security rule corresponding to the identified second security activity.

9. The method of claim 1, further comprising:
receiving a query by a network security device wherein the receiving network security device is at least one of the first and second network security devices;
determining whether the receiving network security device is in a path of the query;
if not in the query path, send an error handler packet to a network security device that is upstream from the receiving network security device;
else, determining if the receiving network security device is a destination for the query;
if the receiving network security device is the destination, send a reply packet to the upstream network security device;
else, determining if a next hop network security device in the query path is in a downstream network security device list of the receiving network security device;
if the next hop network security device is in the downstream network security device list, relaying the query to the next hop network security device;

else, send an error handler packet to the upstream network security device.

10. A system for providing network security across a cooperative security fabric, the system comprising:
a cloud based cooperative security fabric root services device including a processing resource;
a non-transitory computer readable storage medium coupled to the processing resource and having stored therein instructions that when executed by the processing resource cause the processing resource to:
receive a security rule relevant to at least a first cooperative security fabric, wherein the cloud based cooperative security fabric root services device is communicably coupled to at least the first cooperative security fabric and a second cooperative security fabric;
select at least a first network security device within the first cooperative security fabric in which the security rule will be implemented;
create a first security message specific to the first network security device, wherein the first security message includes an instruction to implement at least a portion of the security rule on the first network security device;
transmit the first security message to the first network security device via the first cooperative security fabric;
select a family mode for the first cooperative security fabric, wherein the family mode selection comprises:
switching network security devices included in the first cooperative security fabric to the family mode; and
responsive to the family mode selection, changes to security processes for a respective network security device within the first cooperative security fabric are only accepted from the cloud based cooperative security fabric root services device.

11. The system of claim 10, wherein the security rule is further relevant to the second cooperative security fabric, and wherein the non-transitory computer readable storage medium further has stored therein instructions that when executed by the processing resource cause the processing resource to:
select at least a second network security device within the second cooperative security fabric in which the security rule will be implemented; and
create a second security message specific to the second network security device, wherein the second security message includes an instruction to implement at least one of the portions of the security rule on the second network security device.

12. The system of claim 10, wherein the cloud based cooperative security fabric root services device is not tasked with implementing security protocols for either the first cooperative security fabric or the second cooperative security fabric.

13. The system of claim 10, wherein the first cooperative security fabric includes an end node through which all communication between the first cooperative security fabric and the cloud based cooperative security fabric root services device passes.

14. The system of claim 13, wherein the end node is selected from a group consisting of: a secure access service edge device, and a zero trust network access device.

15. The system of claim 10, wherein the non-transitory computer readable medium further includes a machine learning module configured to monitor behaviors on the first cooperative security fabric that is applicable to the second cooperative security fabric.

16. The system of claim 15, wherein the machine learning module is configured to:
identify a security activity occurring on the first cooperative security fabric; and
based upon the identified security activity, select at least a third network security device within the second cooperative security fabric related to the identified security activity; and
create a third security message specific to the third network security device, wherein the third security message includes an instruction to implement a security rule corresponding to the identified security activity.

17. The system of claim 16, wherein the security activity is a first security activity, and wherein the machine learning module is further configured to:
identify a second security activity occurring on the second cooperative security fabric;
based upon the identified second security activity, select at least a fourth network security device within the first cooperative security fabric related to the identified second security activity; and
create a fourth security message specific to the fourth network security device, wherein the fourth security message includes an instruction to implement a security rule corresponding to the identified second security activity.

18. The system of claim 10, further comprising:
receiving a query by the first network security device, wherein the first network security device is a receiving network device;
determining whether the receiving network security device is in a path of the query;
if not in the query path, send an error handler packet to a network security device that is upstream from the receiving network security device;
else, determining if the receiving network security device is a destination for the query;
if the receiving network security device is the destination, send a reply packet to the upstream network security device;
else, determining if a next hop network security device in the query path is in a downstream network security device list of the receiving network security device;
if the next hop network security device is in the downstream network security device list, relaying the query to the next hop network security device;
else, send an error handler packet to the upstream network security device.

19. A non-transitory computer readable storage medium, the non-transitory computer readable storage medium having stored therein instructions that when executed by a processing resource of a cloud based cooperative security fabric root services device cause the processing resource to:
receive a security rule relevant to at least a first cooperative security fabric, wherein the cloud based cooperative security fabric root services device is communicably coupled to at least the first cooperative security fabric and a second cooperative security fabric;
select at least a first network security device within the first cooperative security fabric in which the security rule will be implemented;

create a first security message specific to the first network security device, wherein the first security message includes an instruction to implement at least a portion of the security rule on the first network security device;
transmit the first security message to the first network security device via the first cooperative security fabric;
select a family mode for the first cooperative security fabric, wherein the family mode selection comprises: switching network security devices included in the first cooperative security fabric to the family mode; and
responsive to the family mode selection, changes to security processes for a respective network security device within the first cooperative security fabric are only accepted from the cloud based cooperative security fabric root services device.

20. The non-transitory computer readable storage medium of claim 19, wherein the security rule is further relevant to the second cooperative security fabric, and wherein the non-transitory computer readable medium further has stored therein instructions that when executed by the processing resource cause the processing resource to:
select at least a second network security device within the second cooperative security fabric in which the security rule will be implemented;
create a second security message specific to the second network security device, wherein the second security message includes an instruction to implement at least one of the portions of the security rule on the second network security device.

\* \* \* \* \*